United States Patent
Kikuchi et al.

(10) Patent No.: US 6,792,912 B2
(45) Date of Patent: Sep. 21, 2004

(54) DIRECT FUEL INJECTION COMBUSTION CONTROL SYSTEM

(75) Inventors: Tsutomu Kikuchi, Setagaya-ku (JP); Shinichi Okamoto, Yokohama (JP); Masahiko Yuya, Yokohama (JP); Kazuhiro Semii, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/737,985

(22) Filed: Dec. 18, 2003

(65) Prior Publication Data

US 2004/0149253 A1 Aug. 5, 2004

(30) Foreign Application Priority Data

Jan. 31, 2003 (JP) ........................................ 2003-023317

(51) Int. Cl.[7] ................................................ F02B 3/00
(52) U.S. Cl. ........................ 123/294; 123/332; 123/334
(58) Field of Search ................................. 123/294, 305, 123/332, 333, 334, 335, 395, 406.12, 406

(56) References Cited

U.S. PATENT DOCUMENTS

| | | | | |
|---|---|---|---|---|
| 5,878,711 A | * | 3/1999 | Kamura et al. | 123/295 |
| 6,138,638 A | * | 10/2000 | Morikawa | 123/295 |

FOREIGN PATENT DOCUMENTS

| | | |
|---|---|---|
| JP | 03-119551 U | 12/1991 |
| JP | 09-228864 A | 9/1997 |
| JP | 2000-018067 A | 1/2000 |

* cited by examiner

Primary Examiner—Bibhu Mohanty
(74) Attorney, Agent, or Firm—Shinjyu Global IP Counselors, LLP.

(57) ABSTRACT

A combustion control system controls combustion in a direct fuel injection spark ignition engine that maintains a constant pressure in an accumulator when fuel is not being injected. The combustion control system controls combustion when fuel injection is resumed after being temporarily stopped. The combustion control system has a target fuel pressure acquiring section that acquires a target fuel pressure based on an engine rotational speed and an engine load, an actual fuel pressure detecting section that the actual fuel pressure, a timing acquiring section, and a first timing control section. The timing acquiring section acquires the fuel injection timing and ignition timing (50 and 30 degrees BTDC) based on the rotational speed and load. The first timing control section controls the fuel injection timing and the ignition timing based on actual fuel pressure, e.g., retards the fuel injection and ignition timings to 40 and 25 degrees BTDC.

16 Claims, 12 Drawing Sheets

(a) TARGET FUEL PRESSURE MAP (b) FUEL INJECTION TIMING MAP (c) IGNITION TIMING MAP (d) AIR-FUEL RATIO MAP

| ACTUAL FUEL PRESSURE (MPa) | FUEL INJECTION TIMING (Deg. BTDC) | IGNITION TIMING (Deg. BTDC) |
|---|---|---|
| 5 (TARGET VALUE) | 50 | 35 |
| 6 | 45 | 30 |
| 7 | 40 | 25 |
| 8 | 35 | 20 |

Fig. 6

DIRECT FUEL INJECTION COMBUSTION CONTROL SYSTEM

BACKGROUND OF THE INVENTION

1. Field of the Invention

The present invention relates to a combustion control system and a combustion control method for a direct fuel injection spark ignition engine. More particularly, the present invention relates to a direct fuel injection combustion control system for a direct fuel injection spark ignition engine having a high-pressure fuel delivery system configured to supply fuel to a fuel injection valve that injects fuel directly into a combustion chamber and maintain a constant pressure inside an accumulator when fuel is not being injected, the direct fuel injection spark ignition engine being controlled such that fuel injection from the fuel injection valve is temporarily stopped under prescribed operating conditions and resumed after a prescribed amount of time has elapsed.

2. Background Information

The fuel efficiency of direct fuel injection spark ignition engines is being improved by injecting fuel directly into the combustion chamber during the compression stroke, generating a very rich air-fuel mixture in the vicinity of the spark plug, and performing stratified combustion so that, overall, a lean air-fuel mixture is be used. Since the fuel is injected against the high pressure of the combustion chamber during the compression stroke, it is necessary to use a fuel pump system that injects the fuel with higher pressure than is used in port injection engines. This fuel pump system is generally an accumulator-type system in which fuel is pumped into an accumulator having a constant volume with a high-pressure fuel pump. As the fuel is injected into the combustion chamber with a fuel injection valve, the fuel pressure inside the accumulator is held at a target pressure by using a fuel pressure sensor and replenishing the fuel. The target fuel pressure required varies depending on such operating conditions as the engine rotational speed and the load. Normally, target fuel pressures corresponding to different engine speeds and loads are set in advance. In an accumulator-type fuel pump system, the fuel pressure inside the accumulator remains constant so long as fuel is not injected from the fuel injection valve.

This kind of direct fuel injection spark ignition engine generally performs fuel cutting, i.e., stops injection of the fuel, when it is not necessary to generate torque, such as when the accelerator is released during deceleration or after engine warm-up. After the fuel injection is stopped, the target fuel pressure decreases along with the decrease in engine rotational speed and load but the actual fuel pressure inside the accumulator remains at the fuel pressure that existed at the point in time when fuel injection was stopped. Consequently, a gap exists between the actual fuel pressure and the target fuel pressure when it is time to resume fuel injection and the penetration of the fuel spray will not be appropriate if fuel injection is resumed at the fuel injection timing and ignition timing corresponding to the target fuel pressure. More specifically, the fuel injection timing and ignition timing are too early in view of the actual fuel pressure in the accumulator. Consequently, the air-fuel mixture having the optimum air-fuel ratio will not be at the desired location when spark ignition occurs.

As a result, there is a possibility that any of the following may occur: the operating performance will degrade when the vehicle accelerates due to the resumption of fuel injection; degraded combustion will cause incompletely burned gasses to be discharged due to misfiring, leading to degraded exhaust gas; and the fuel cannot be ignited and the engine will stall.

One existing method for addressing this problem is to establish a delay time for allowing the fuel pressure to decrease between the time when the fuel injection stop conditions are satisfied and the time when the fuel injection is stopped. The fuel injection is continued for the duration of the delay time and the fuel pressure inside the accumulator is reduced to the target fuel pressure. For example, see Japanese Laid-Open Patent Publication No. 2000-18067 (pages 3 and 4, FIG. 5).

Another method is to modify the injection pulse width in accordance with the delay in the rise of the fuel pressure, thereby preventing the discharge of unburned gases. For example, see Japanese Unexamined Utility Model Publication No. 3-119551.

Still another method is to calculate the difference between the pressure inside the combustion chamber and the fuel pressure inside the accumulator and modify the injection pulse time based on that difference, thereby allowing the desired fuel injection quantity to be obtained even the injection timing is changed. For example, see Japanese Laid-Open Patent Publication No. 9-228864 (page 4, FIG. 3)

In view of the above, it will be apparent to those skilled in the art from this disclosure that there exists a need for an improved direct fuel injection combustion control system. This invention addresses this need in the art as well as other needs, which will become apparent to those skilled in the art from this disclosure.

SUMMARY OF THE INVENTION

It has been discovered that in the technology of Japanese Laid-Open Patent Publication No. 2000-18067 a long delay time (e.g., 1000 msec) is required to be set in order to lower the actual fuel pressure to the target fuel pressure. Since fuel continues to be injected during this period, the act of stopping the fuel injection does not provide the effect of reducing the fuel consumption.

The technology of Japanese Unexamined Utility Model Publication No. 3-119551 adjusts the injection pulse width, but the operating performance at the time of fuel injection resumption cannot be sufficiently improved by merely adjusting the injection pulse width. The technology of Japanese Laid-Open Patent Publication No. 9-228864 detects the pressure inside the combustion chamber and the fuel pressure inside the accumulator and adjusts the injection pulse width based on the detected pressure values, but, again, the operating performance at the time of fuel injection resumption cannot be sufficiently improved.

The present invention concerns combustion control systems for direct fuel injection spark ignition engines configured to maintain a constant pressure in the accumulator when fuel is not being injected. An object of the present invention is to improve the combustion control executed by such a combustion control system when fuel injection is resumed after being temporarily stopped.

The present invention basically relates a combustion control system for a direct fuel injection spark ignition engine that comprises a target fuel pressure acquiring section, an actual fuel pressure detecting section, a timing acquiring section, and a first timing control section. The target fuel pressure acquiring section is configured to acquire a target fuel pressure required to resume fuel injection based on operating conditions existing when fuel injection is determined to be resumed after a prescribed amount of time has elapsed since fuel injection was temporarily stopped due to occurrence of prescribed operating conditions. The actual fuel pressure detecting section is configured to detect an actual fuel pressure inside an accumulator of a high-pressure fuel delivery system when fuel injection is determined to be resumed. The timing acquiring section is configured to acquire a fuel injection timing and an ignition timing required to resume fuel injection based on the operating conditions existing when fuel injection is determined to be resumed. The first timing control section is configured to compare the target fuel pressure and the actual fuel pressure and modify at least one of the fuel injection timing and the ignition timing based on a result of the comparison when fuel injection is to be resumed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 6 is a combustion condition map that maps the combustion conditions to the actual fuel pressure;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
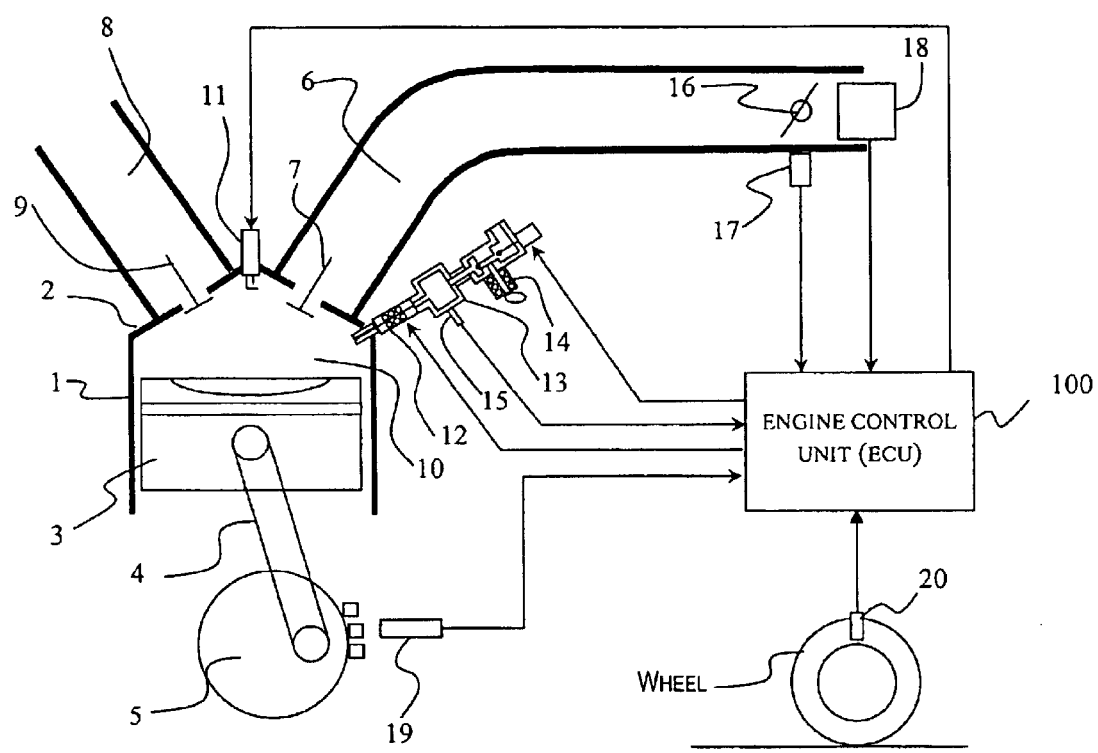
FIG. 1 is a schematic view of a direct fuel injection spark ignition engine that utilizes a combustion control system in accordance with the present invention.

Referring initially to FIG. 1, a direct fuel injection gasoline engine is schematically illustrated that is equipped with a direct fuel injection combustion control system in accordance with a first embodiment of the present invention. The gasoline engine basically has an engine main body comprising a cylinder block 1 and a cylinder head 2, a plurality of pistons 3 (only one shown), an air intake port 6 formed in the cylinder head 2 for each cylinder, an exhaust port 8 formed in the cylinder head 2 for each cylinder, a spark ignition device 11 mounted to the top of the cylinder head 2 for each cylinder, a fuel injection valve 12 mounted on a side of the cylinder head 2 formed in the cylinder head 2 for each cylinder, and an engine control unit or computer 100 for controlling the combustion of the engine. While only one cylinder of the engine is illustrated for the sake of simplicity, the present invention will typically be utilized in an engine with a plurality of cylinders.

The piston 3 is arranged inside the cylinder of the cylinder block 1 such that it can move up and down. The piston 3 is connected to a crankshaft 5 through a connecting rod 4. The reciprocating motion of the piston 3 is transferred to the crankshaft 5 through the connecting rod 4 and is converted to rotational motion of the crankshaft 5. A crank angle sensor 19 is operatively connected to the engine control unit 100 and outputs a signal indicative of the rotation angle of the crankshaft to the engine control unit 100. The cylinder block 1, the cylinder head 2, and the piston 3 form a pent roof shaped combustion chamber 10.

The air intake port 6 is formed on the cylinder head 2 and is provided with an intake valve 7 in the vicinity of the opening into the combustion chamber 10. The intake valve 7 serves to allow and disallow communication between the air intake port 6 and the combustion chamber 10. Air is drawn into the combustion chamber 10 when communication is allowed. A throttle valve 16 is arranged in an upstream portion of the air intake port 6. The opening of the throttle valve 16 is adjusted by the accelerator pedal and functions to adjust the flow rate of the air drawn into the combustion chamber 10 through the air intake port 6. A throttle opening sensor 17 is provided in the throttle valve 16 and the throttle opening sensor 17 is operatively connected to the engine control unit 100. The throttle opening sensor 17 detects the degree to which the throttle valve 16 is open and outputs a control signal indicative of the detected value to the engine control unit 100. An airflow sensor 18 is arranged upstream of the throttle valve 16 and the airflow sensor 18 is operatively connected to the engine control unit 100. The airflow sensor 18 is configured and arranged to detect the quantity of intake air or air flow rate and output a control signal indicative of the detected value to the engine control unit 100. The exhaust port 8 is formed on the cylinder head 2 and is provided with an exhaust valve 9 in the vicinity of the opening leading from the exhaust port 8 into the combustion chamber 10. The exhaust valve 9 serves to allow and disallow communication between the exhaust port 8 and the cylinder head 2. When the exhaust valve 9 allows communication between the exhaust port 8 and the cylinder head 2, post-combustion gases are discharged from the combustion chamber 10.

The spark ignition device 11 is installed in the top of the cylinder head 2 so as to face the approximate center of the cylinder and is operatively connected to the engine control unit 100. The spark ignition device 11 generates a spark based on an ignition timing signal from the engine control unit 100 and ignites the air-fuel mixture.

The fuel injection valve 12 is connected to the engine control unit 100 and arranged on the side of the cylinder head 2 where the air intake port 6 is formed. The fuel injection valve 12 injects fuel into the combustion chamber 10 based on fuel injection timing and ignition timing signals from the engine control unit 100. An accumulator 13 is arranged upstream of the fuel injection valve 12 and a high-pressure fuel pump 14 is arranged upstream of the accumulator 13. The accumulator 13 stores fuel delivered from the high-pressure fuel pump 14. A fuel pressure sensor 15 is provided on the accumulator 13 and the fuel pressure sensor 15 is connected to the engine control unit 100. The fuel pressure sensor 15 detects the pressure of the fuel inside the accumulator 13 and outputs a control signal indicative of the detected value to the engine control unit 100. The high-pressure fuel pump 14 functions to pressurize fuel pumped thereto from the fuel tank with a low-pressure fuel pump or the like to the desired pressure and deliver the pressurized fuel to the accumulator 13. The high-pressure fuel pump 14 comprises a plunger that is moved up and down with a cam, two valves disposed on the upstream side and downstream side, respectively, of the plunger, and an actuator that opens and closes the two valves. The high-pressure fuel pump 14 pressurizes the incoming fuel by moving the plunger up and down and opening and closing the two valves with the actuator; it then discharges the pressurized fuel to the accumulator 13.

The engine control unit 100 preferably includes a microcomputer with a combustion control program that controls the combustion of the engine as discussed below. The engine control unit 100 also includes other conventional components such as an input interface circuit, an output interface circuit, and storage devices such as a ROM (Read Only Memory) device and a RAM (Random Access Memory) device. The engine control unit 100 is operatively coupled to various sensors in a conventional manner. The internal RAM of the engine control unit 100 stores statuses of operational flags and various control data. The internal ROM of the engine control unit 100 stores the maps and other prestored data for various operations. It will be apparent to those skilled in the art from this disclosure that the precise structure and algorithms for the engine control unit 100 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The engine control unit 100 is electrically connected to the fuel pressure sensor 15, the throttle opening sensor 17, the airflow sensor 18, the crank angle sensor 19, and the vehicle speed sensor 20 so as to receive control signals indicative of detection values from each of these sensors. The engine control unit 100 is also connected to the fuel injection valve 12 and the high-pressure fuel pump 14 and issues signals that drive these devices. Based on the detection value from the fuel sensor 15, the engine control unit 100 issues a drive signal to the actuator of the high-pressure fuel pump 14 so that the fuel pressure inside the accumulator 13 is brought to the target fuel pressure. Based on the detection value from the crank angle sensor 19, the engine control unit 100 issues signals for the fuel injection timing and the ignition timing to the fuel injection valve 12 and the spark ignition device 11. Based on the detection signals from the crank angle signal 19, the vehicle speed sensor 20, and the throttle opening sensor 22, the engine control unit 100 determines when to stop and when to resume the fuel injection. The engine control unit 100 also calculates the quantity of fuel to inject based on the intake air quantity detected by the airflow sensor 15 and the air-fuel ratio and outputs a fuel injection quantity signal to the fuel injection valve 12.

The combustion control program of the engine control unit 100 preferably includes a target fuel pressure acquiring section, an actual fuel pressure detecting section, a timing acquiring section, and a first timing control section. These sections of the combustion control program are basically shown by the steps of the flow chart illustrated in FIG. 5 in the first embodiment of the present invention. The target fuel pressure acquiring section (step S14) is configured to acquire a target fuel pressure required to resume fuel injection based on operating conditions existing when fuel injection is determined to be resumed after a prescribed amount of time has elapsed since fuel injection was temporarily stopped due to occurrence of prescribed operating conditions. The actual fuel pressure detecting section (step S15) is configured to detect an actual fuel pressure inside an accumulator of a high-pressure fuel delivery system when fuel injection is determined to be resumed. The timing acquiring section (steps S17 and S18) is configured to acquire a fuel injection timing and an ignition timing required to resume fuel injection based on the operating conditions existing when fuel injection is determined to be resumed. The first timing control section (steps S16-22) is configured to compare the target fuel pressure and the actual fuel pressure and modify at least one of the fuel injection timing and the ignition timing based on a result of the comparison when fuel injection is to be resumed.

Thus, with the present invention, the fuel injection timing and ignition timing are not determined based on the operating conditions alone when it is time to resume fuel injection after fuel injection has been temporarily stopped. Instead, the fuel injection timing and/or the ignition timing are/is modified in accordance with the actual fuel pressure inside the accumulator of the high-pressure fuel delivery system, enabling the air-fuel mixture having the optimum air-fuel ratio to be positioned in the desired location when spark ignition occurs. As a result, the combustion control executed when fuel injection is resumed after being temporarily stopped can be improved.

Combustion Condition Maps Based on Operating Conditions

The combustion conditions will now be explained for conducting stratified combustion in the direct fuel injection gasoline engine that was just briefly described.

Figure 2:
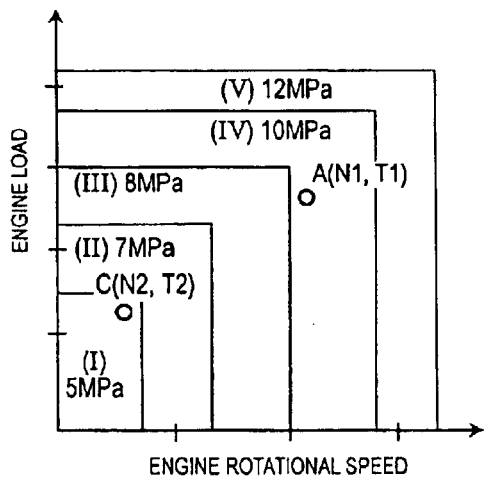
FIG. 2 shows maps of combustion conditions based on the operating conditions (engine rotational speed and engine load)
Figure 2:
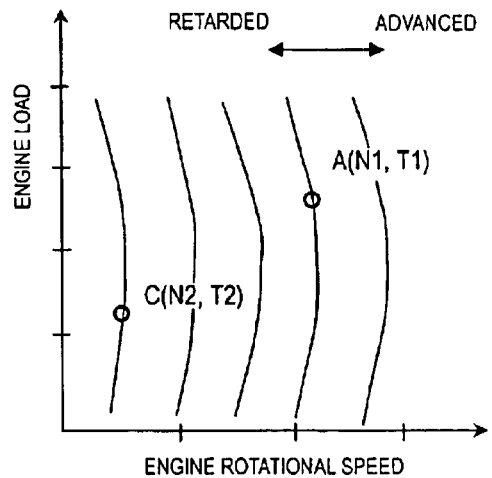
Figure 2:
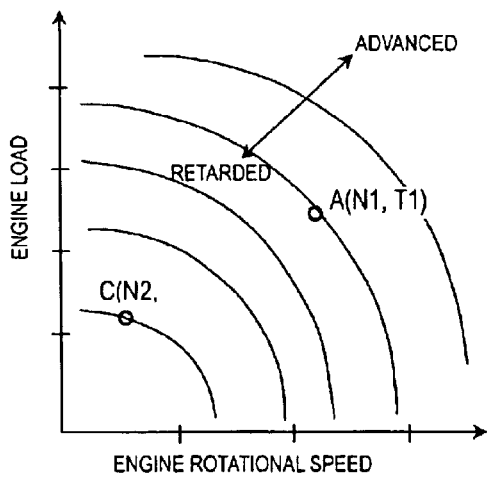
Figure 2:
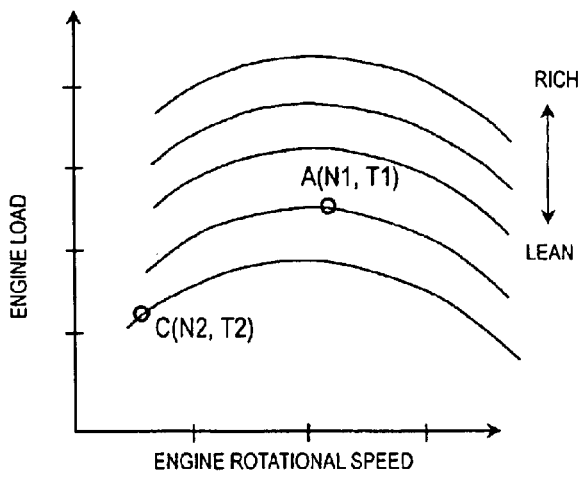

FIG. 2 shows maps of each combustion condition plotted against the operating conditions (engine rotational speed and engine load) of the engine.

Map (a) of the FIG. 2 is a map of the target fuel pressure based on the operating conditions. The target fuel pressure is the target fuel pressure required inside the accumulator 13 based on the engine rotational speed and the engine load. The target fuel pressure increases as the engine rotational speed and engine load increase, as indicated by the regions (I) to (V) in map (a).

Map (b) of the FIG. 2 is a map of the fuel injection timing based on the operating conditions, while map (c) of the FIG. 2 is a map of the ignition timing based on the operating conditions. The fuel injection timing and the ignition timing are set according to their respective curves such that the penetration of the air-fuel mixture is optimum for the particular engine rotational speed and the engine load. Each curve in map (b) is a line of constant fuel injection timing; as the engine rotational speed increases the fuel injection timing becomes more advanced, and as the engine rotational speed decreases the fuel injection timing becomes more retarded. Each curve in map (c) is a line of constant ignition timing; as the engine rotational speed and engine load increase the fuel injection timing becomes more advanced, and as the engine rotational speed and engine load decrease the fuel injection timing becomes more retarded.

Map (d) of the FIG. 2 is a map of the air-fuel ratio based on the operating conditions. Each curve indicates the air-fuel ratio required for the particular engine rotational speed and engine load. The air-fuel ratio decreases (becomes richer) as the engine load increases and increases (becomes leaner) as the engine load decreases.

As seen in FIG. 2, the point A (N1, T1) in each map indicates the operating state immediately before fuel injection is stopped due to deceleration or the like. The coordinate values N1 and T1 are the engine rotational speed and engine load, respectively, at that time. The point C (N2, T2) is the operating state when fuel injection is resumed. The coordinate values N2 and T2 are the engine rotational speed and engine load, respectively, at that time and are smaller than the values N1 and T1. When the operating stage changes from point A (N1, T1) to point C (N2, T2), the target fuel pressure decreases from 10 MPa to 5 MPa and the fuel injection timing and ignition timing both shift to more retarded timings.

These kinds of operating condition-based maps are stored in the ROM or other memory of the engine control unit 100 and used for combustion control. During normal operation, the maps (a) to (d) of FIG. 2 are used to determine the target fuel pressure, the fuel injection timing, the ignition timing, and the air-fuel ratio. The air-fuel ratio and the intake air quantity are used to calculate the fuel injection quantity. The target fuel pressure, the fuel injection timing, the ignition timing, and the fuel injection quantity are then used to control the combustion.

Timing Charts

Figure 3:
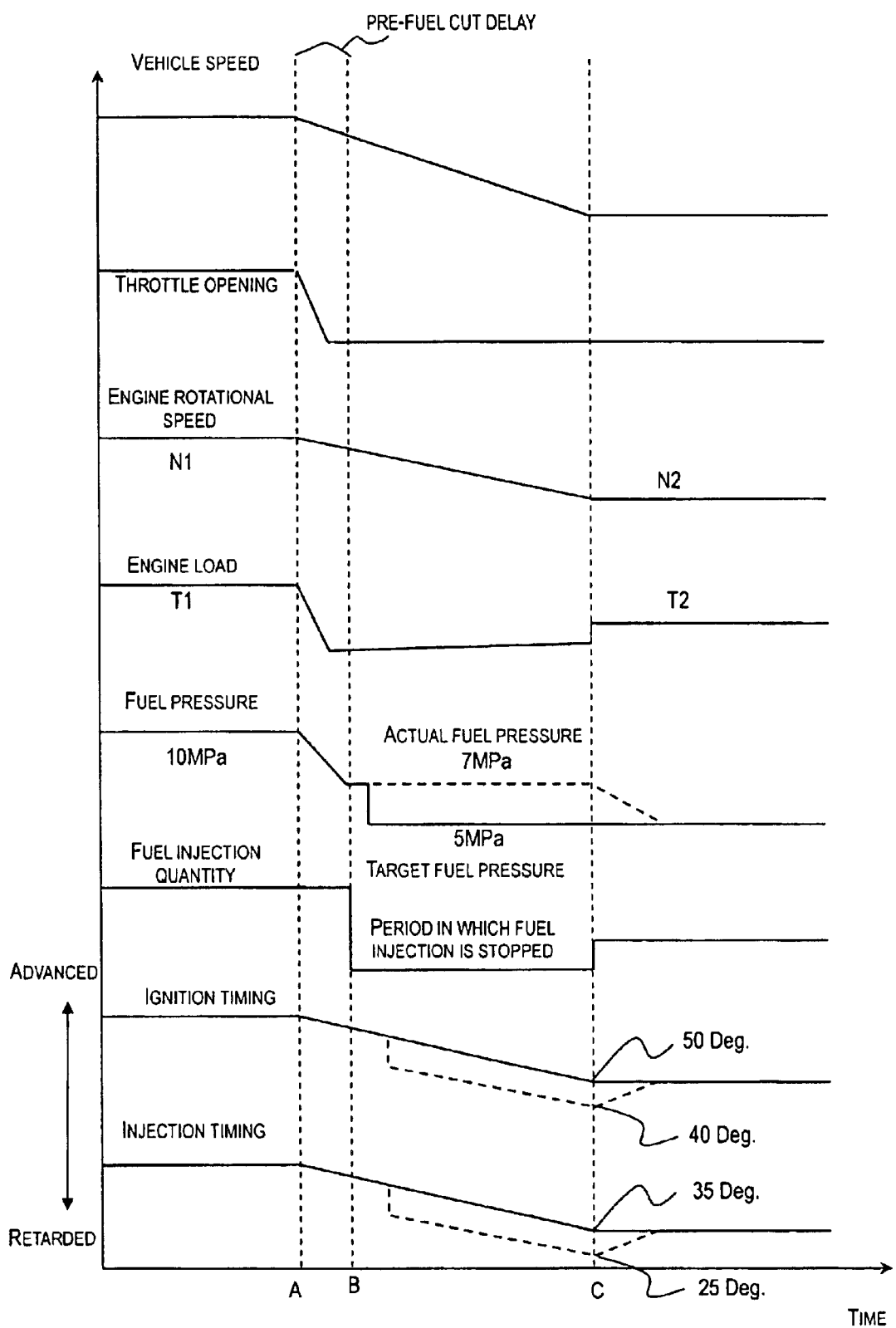
FIG. 3 shows timing charts for a case in which the throttle valve is closed and deceleration is commenced during state-state travel and fuel injection is resumed when a prescribed time period has elapsed and the engine rotational speed has reached a prescribed rotational speed.

FIG. 3 shows timing charts for a case in which the accelerator is released and deceleration is commenced at an operating state or point A during state-state travel and fuel injection is resumed when the engine rotational speed reaches a prescribed rotational speed. More specifically, the accelerator is released at the operating state or point A and fuel injection is continued for the duration of a pre-fuel cut delay period. Then, at an operating state or point B fuel injection is stopped. After a non-fuel injection period has elapsed, fuel injection is resumed at an operating state or point C when the engine rotational speed reaches N2. The pre-fuel cut delay period is a period of time during which fuel injection is continued after the throttle valve 16 has closed in order to alleviate the shock resulting from stopping fuel injection. The pre-fuel cut delay period is, for example, approximately 500 msec.

Immediately before the operating state or point A, the engine rotational speed is N1, the engine load is T1, and the values of the target fuel pressure, the fuel injection timing, and the ignition timing are determined by the values N1 and T1 on the operating condition-based maps (a) to (c) in FIG. 2. More specifically, the target fuel pressure is 10 MPa, the fuel injection timing is 50 degrees, and the ignition timing is 30 degrees. The fuel injection timing and ignition timing are specified as the number of degrees before top dead center (BTDC). The value of the fuel injection quantity is determined by the values N1 and T1 on the operating condition-based map (d) in FIG. 2. Immediately before operating state or point A, the fuel pressure (actual fuel pressure) inside the accumulator 13 has been adjusted such that it matches the target fuel pressure.

When the throttle valve 16 is closed at the operating state or point A, the vehicle speed and the engine rotational speed decrease gradually while the load decreases rapidly and then becomes constant. Between the points A and B, fuel is injected from the fuel injection valve 12 but fuel is not supplied from the high-pressure fuel pump 15 to the accumulator 13. Consequently, the actual fuel pressure inside the accumulator 13 does not reach the target fuel pressure of 5 MPa until after the point A.

After point B, the fuel injection valve 12 is closed and the fuel injection quantity goes to zero. The target fuel pressure decreases to 5 MPa in accordance with the operating condition-based map (a) in FIG. 2, as indicated by the solid line in figure 32. Meanwhile, the actual fuel pressure is maintained at a constant pressure (i.e., 7 MPa as indicated by the broken line in the FIG. 3) because fuel injection from the fuel injection valve 12 has been stopped and the fuel inside the accumulator 13 has nowhere else to go. The fuel injection timing and ignition timing shift to more retarded timings in accordance with the operating condition-based maps (b) and (c) of FIG. 2, as indicated by the solid lines in FIG. 3, but since the actual fuel pressure has not decreased to the target fuel pressure, these timings are too advanced with respect to the actual fuel pressure.

When fuel injection resumes at point C, the actual fuel pressure is 2 MPa larger than the target fuel pressure and the fuel injection timing and ignition timing are too advanced in view of the actual fuel pressure. Also, the fuel injection quantity is a value calculated based on the intake air quantity and the air-fuel ratio determined by the values N2 and T2 in the operating condition-based map (d) of FIG. 2. If fuel injection is resumed using the over-advanced fuel injection timing and ignition timing just described, then the air-fuel mixture having the optimum air-fuel ratio will be in the wrong position at the time of spark ignition. Therefore, the fuel injection timing and ignition timing are retarded (in a manner described later) as indicated by broken lines in the FIG. 3 so that the position of the air-fuel mixture having the optimum air-fuel ratio will be in the appropriate position at the time of spark ignition even if the actual fuel pressure is higher than the target fuel pressure.

Combustion Modification Maps Based on Actual Fuel Pressure

Figure 4:
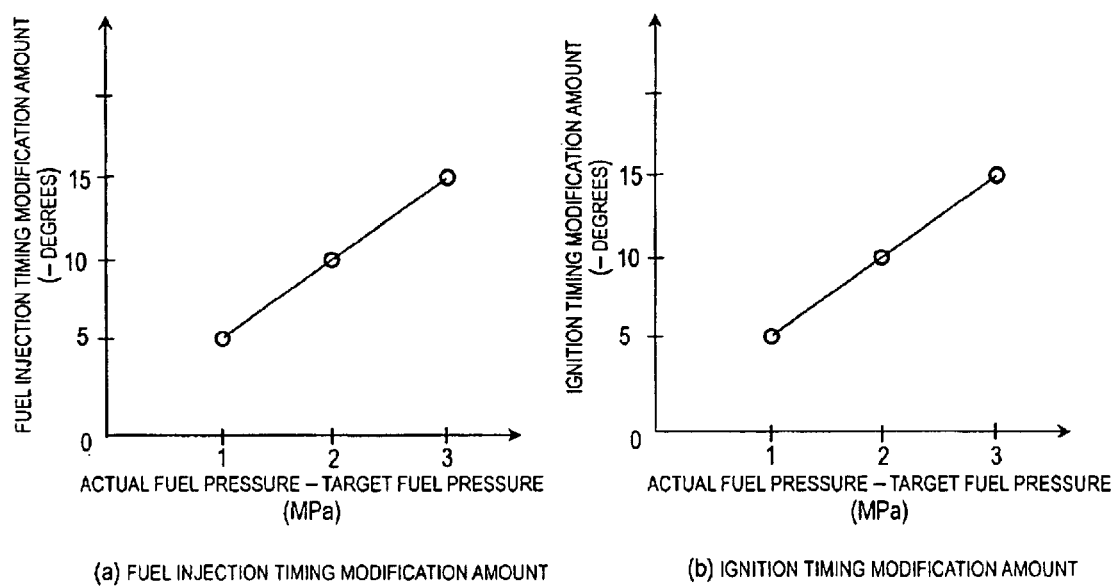
FIG. 4 shows maps for modifying based on the actual fuel pressure.

The modification (retardation) of the fuel injection timing and ignition timing will now be described with reference to FIG. 4. FIG. 4 shows maps for modifying based on the actual fuel pressure. Map (a) of FIG. 4 is a plot of the fuel injection timing modification amount (retardation amount) versus the amount by which the actual fuel pressure exceeds the target fuel pressure. Map (b) of FIG. 4 is a plot of the ignition timing modification amount (retardation amount) versus the amount by which the actual fuel pressure exceeds the target fuel pressure. As shown in maps (a) and (b), the difference between the actual fuel pressure and the target fuel pressure becomes larger, the more the fuel injection timing and ignition timing need to be retarded. Modification maps like these are stored in the ROM or other memory of the engine control unit 100 and used for combustion control.

Combustion Control Flowchart

Figure 5:
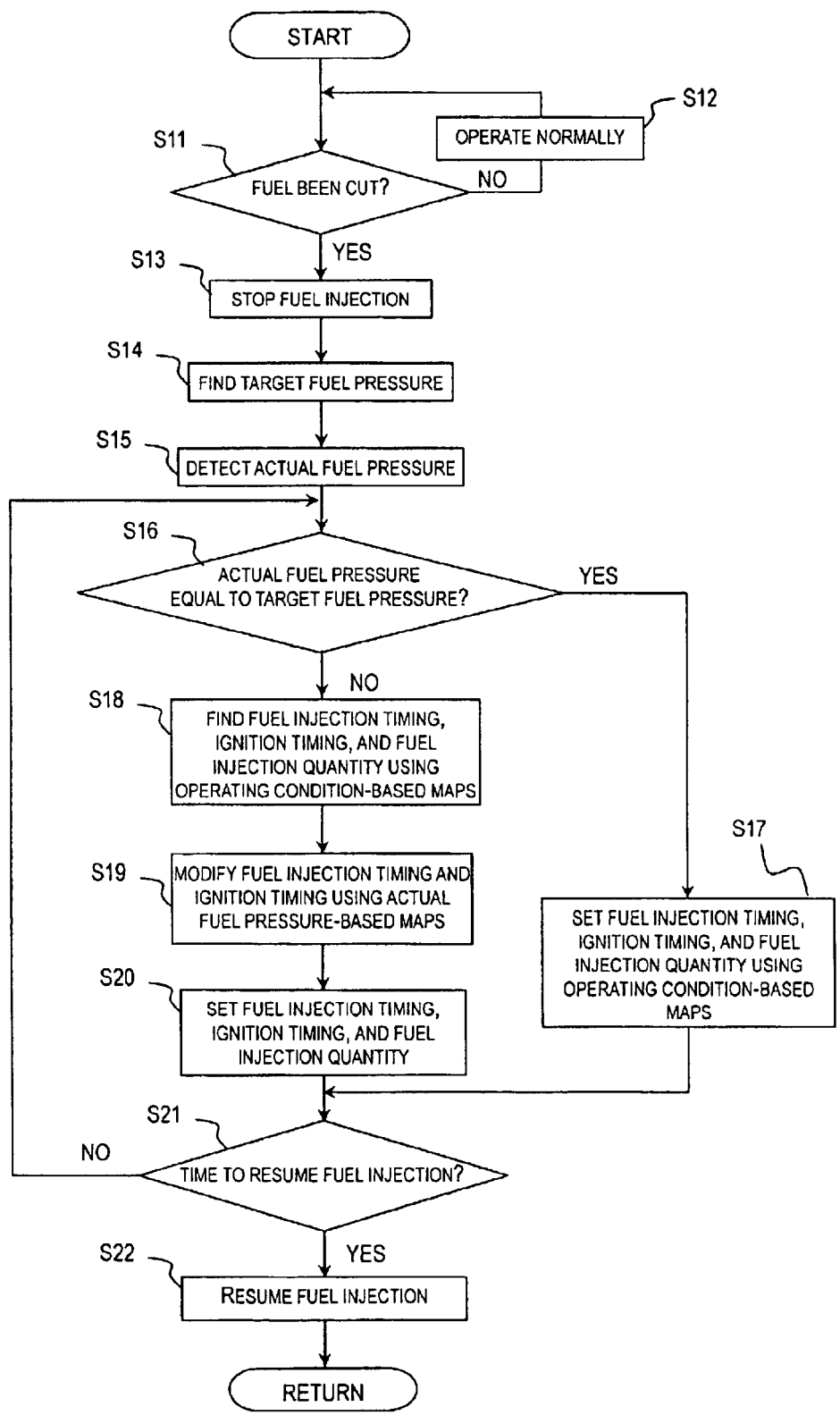
FIG. 5 is a flowchart for combustion control in accordance with the first embodiment.

A flowchart for executing combustion control using the operating condition-based maps (FIG. 2) and the actual fuel pressure-based modification maps (FIG. 4) when fuel injection is resumed after being stopped will now be explained. FIG. 5 is flowchart for combustion control in accordance with the first embodiment.

In step S11, the engine control unit 100 determines if the fuel has been cut. More specifically, the fuel cut conditions are deemed satisfied when the throttle valve 16 has closed and a pre-fuel cut delay period (e.g., 500 msec) has elapsed. Control proceeds to step S12 if the conditions have not been satisfied and to step S13 if the conditions have been satisfied.

In step S12, the operating conditions are normal and the combustion is controlled based on the operating condition-based map (a) of FIG. 2.

In step S13, the fuel injection valve 12 is closed and fuel injection is stopped.

In step S14, the target fuel pressure is determined by referring to the operating condition-based map (a) of FIG. 2.

In step S15, the actual fuel pressure is detected from the fuel pressure sensor 14.

In step S16, the engine control unit 100 determines if the actual fuel pressure matches the target fuel pressure. If so, control proceeds to step 17. If not, control proceeds to step 18.

In step S17, the fuel injection timing and ignition timing are found and set by referring to the operating condition-based maps (b) and (c) of FIG. 2. The air-fuel ratio is also found and set in step S17 by referring to the operating condition-based map (d) of FIG. 2 and the fuel injection quantity is calculated based on this air-fuel ratio and the intake air quantity.

In step S18, the fuel injection timing and ignition timing are found by referring to the operating condition-based maps (b) and (c) of FIG. 2. The air-fuel ratio is also found and set by referring to the operating condition-based map (d) of FIG. 2 and the fuel injection quantity is calculated based on this air-fuel ratio and the intake air quantity.

The step S19, the difference between the actual fuel pressure and the target fuel pressure (actual fuel pressure minus target fuel pressure) is calculated, the modification amounts corresponding to the difference are found by referring to the actual fuel pressure-based modification maps (a) and (b) of FIG. 4, and the fuel injection timing and ignition timing are modified accordingly.

In step S20, the fuel injection timing and ignition timing that were determined in step S19 are set. The fuel injection quantity that was found in step S18 is also set.

In step S21, the engine control unit 100 determines if it is time to resume fuel injection. If not, control returns to step S16. If so, control proceeds to step S22.

In step S22, fuel injection is resumed using the fuel injection timing, ignition timing, and fuel injection quantity set in step S17 or S20 and stratified combustion is conducted.

In a combustion control system in accordance with this embodiment, if there is a gap between the target fuel pressure and the actual fuel pressure inside the accumulator 13 when fuel injection is to be resumed after being stopped, the fuel injection timing and ignition timing determined based on the operating conditions are modified using an actual fuel pressure-based modification maps (a) and (b) of FIG. 4. Consequently, the air-fuel mixture having the optimum air-fuel ratio can be positioned in the desired location at the time of spark ignition. As a result, the combustion control executed when fuel injection is resumed after being temporarily stopped can be improved. More specifically, the operating performance can be prevented from degrading when the vehicle accelerates due to the resumption of fuel injection. Degradation of combustion and the discharge of incompletely burned gases due to misfiring can also be prevented. The engine can also be prevented from stalling due to an inability to ignite the fuel.

With a combustion control system in accordance with this embodiment, it is also acceptable to use an operating condition-based map to set the fuel injection quantity and not modify based on the actual fuel pressure. This makes it possible to prevent the precision of the calculations from degrading due to poor response.

Second Embodiment

In the first embodiment, the fuel injection timing and ignition timing are found using operating condition-based maps (b) and (c) of FIG. 2 and the fuel injection timing and ignition timing are modified using modification amounts found using actual fuel pressure-based modification maps (a) and (b) of FIG. 4. However, it is also acceptable to create an actual fuel pressure-based combustion condition map in advance by mapping the fuel injection timing and ignition timing modified using the actual fuel pressure-based modification map to the actual fuel pressure.

Combustion Condition Map Based on Actual Fuel Pressure

FIG. 6 is a combustion condition map that plots the combustion conditions to the actual fuel pressure. FIG. 6 shows the fuel injection timing and ignition timing versus the actual fuel pressure for a case in which the target fuel pressure is 5 MPa (point C). The fuel injection timing and the ignition timing values corresponding to each actual fuel pressure value are obtained finding the fuel injection timing and ignition timing using the operating condition-based maps (b) and (c) of FIG. 2 and modifying them using the actual fuel pressure-based map of FIG. 6. The fuel injection timing and ignition timing are expressed as the number of degrees in advance of the piston 3 reaching top dead center (i.e., decrees BTDC). Although a case in which the target fuel pressure is 5 MPa is presented here as an example, an actual fuel pressure-based combustion condition map is created for each target pressure and stored in the ROM or other memory of the engine control unit 100 to be used for combustion control.

Combustion Control Flowchart

Figure 7:
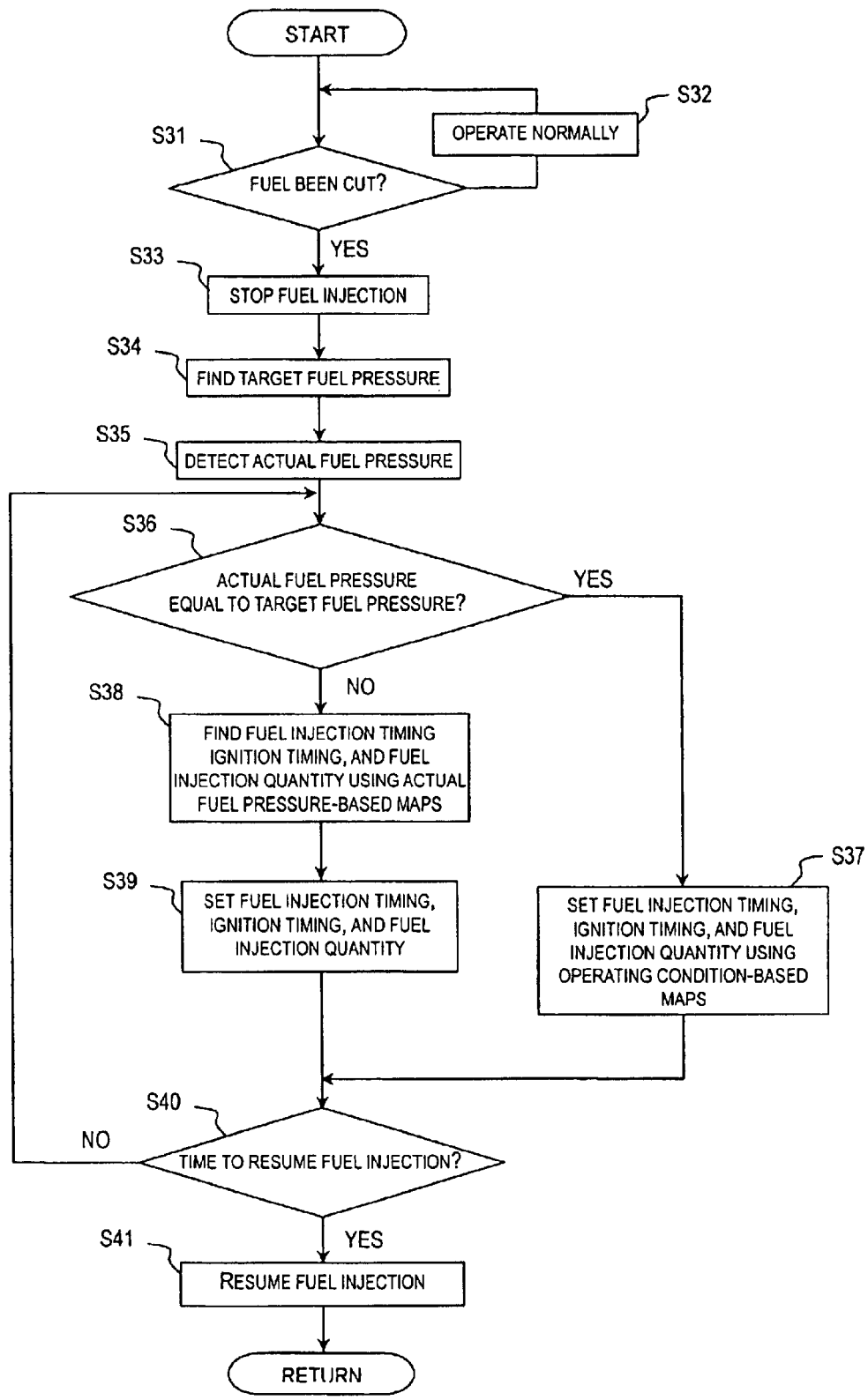
FIG. 7 is a flowchart for combustion control in accordance with the second embodiment.

A flowchart for executing combustion control using operating condition-based maps of FIG. 2 and actual fuel pressure-based modification map of FIG. 6 when fuel injection is resumed after being stopped will now be explained. FIG. 7 is a flowchart for combustion control in accordance with the second embodiment.

Steps S31 to S36 are the same as steps S11 to S16 and thus their explanation is omitted.

In step S37, the fuel injection timing and ignition timing are found and set by referring to the operating condition-based maps (b) and (c) of FIG. 2. The air-fuel ratio is also found by referring to the operating condition-based map (d) of FIG. 2 and the fuel injection quantity is calculated and set based on this air-fuel ratio and the intake air quantity.

In step S38, the fuel injection timing and ignition timing are found by referring to the actual fuel pressure-based map of FIG. 6. The air-fuel ratio is also found by referring to the operating condition-based map (d) of FIG. 2 and the fuel injection quantity is calculated based on this air-fuel ratio and the intake air quantity.

In step S39, the fuel injection timing and ignition timing that were found in step S38) are set. The fuel injection quantity was found in step S38 is also set.

In step S40, it is determined if it is time to resume fuel injection. If not, control returns to step S36. If so, control proceeds to step S41.

In step S41, fuel injection is resumed using the fuel injection timing, ignition timing, and fuel injection quantity set in step S37 or S39 and stratified combustion is conducted.

In a combustion control system in accordance with this embodiment, if there is a gap between the target fuel pressure and the actual fuel pressure inside the accumulator 13 when fuel injection is to be resumed after being stopped, the fuel injection timing and ignition timing determined based on the operating conditions are modified using an actual fuel pressure-based modification map of FIG. 6. Consequently, the air-fuel mixture having the optimum air-fuel ratio can be positioned in the desired location at the time of spark ignition. As a result, the combustion control executed when fuel injection is resumed after being temporarily stopped can be improved. More specifically, the operating performance can be prevented from degrading when the vehicle accelerates due to the resumption of fuel injection. Degradation of combustion and the discharge of incompletely burned gases due to misfiring can also be prevented. The engine can also be prevented from stalling due to an inability to ignite the fuel.

With a combustion control system in accordance with this embodiment, it is also acceptable to use an operating condition-based map to set the fuel injection quantity and not modify based on the actual fuel pressure. This makes it possible to prevent the precision of the calculations from degrading due to poor response.

Also, with a combustion control system in accordance with this embodiment, the fuel injection timing and ignition timing corresponding to actual fuel pressure values are calculated in advance and arranged into an actual fuel pressure-based map. This makes it possible to simplify the processing in comparison with a case in which the fuel injection timing and ignition timing are first found based on the operating conditions and then modified using an actual fuel pressure-based modification map.

Third Embodiment

In the first and second embodiments, stratified combustion is controlled by retarding the fuel injection timing and the ignition timing in accordance with the actual fuel pressure, but merely modifying the fuel injection timing and ignition timing is not sufficient to conduct proper stratified combustion when the amount by which the actual fuel pressure exceeds the target fuel pressure is too large. In this embodiment, when the difference between the actual fuel pressure and the target fuel pressure exceeds a first limit difference value (e.g., 3.25 MPa), stratified combustion is conducted properly by using an air-fuel ratio that is richer than the air-fuel ratio determined using the operating condition-based map (d) of FIG. 2.

Combustion Modification Maps Based on the Air-Fuel Ratio

Figure 8:
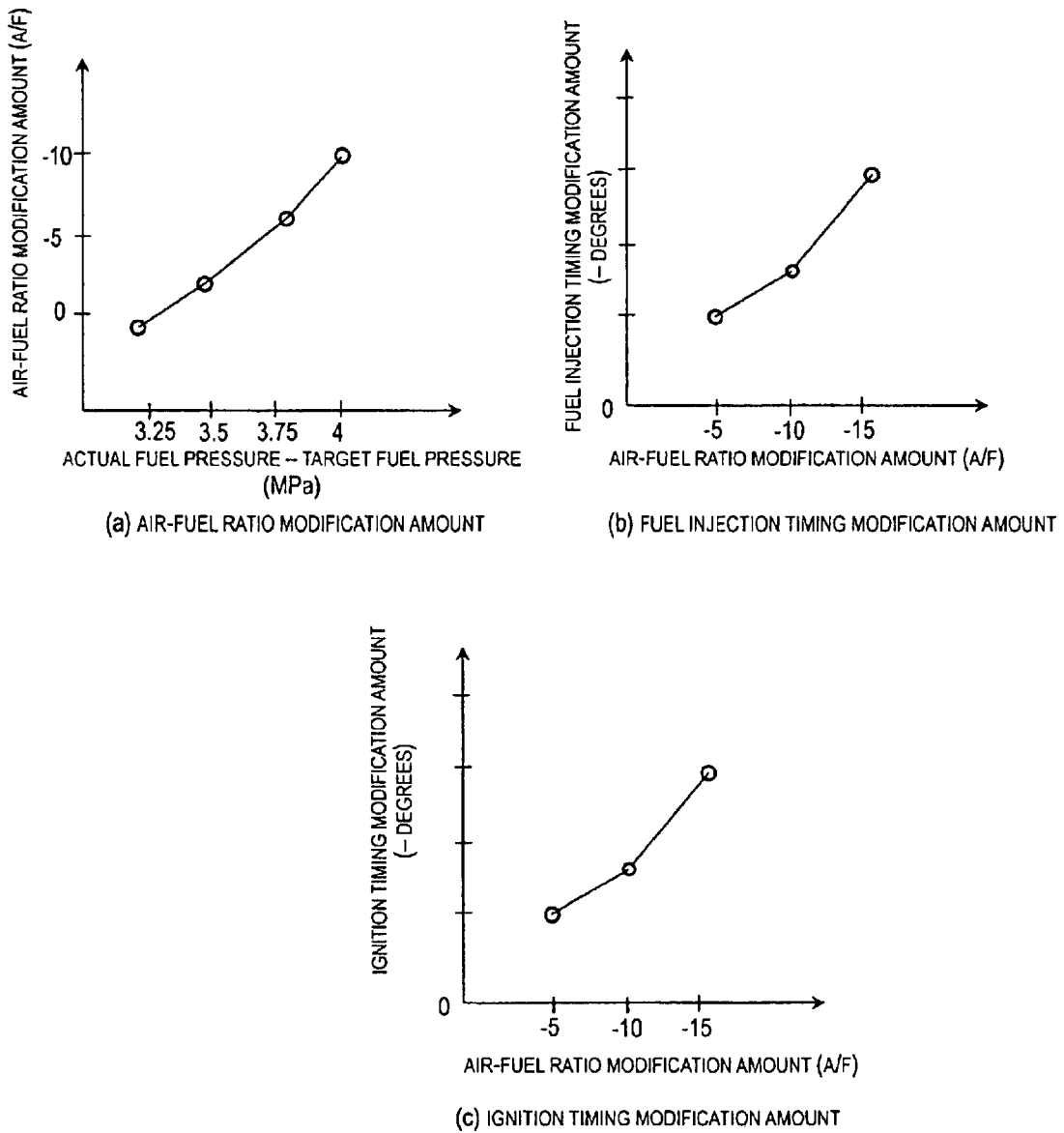
FIG. 8 shows maps for modifying based on the air-fuel ratio when the amount by which the actual fuel pressure exceeds the target fuel pressure is larger than a first limit difference value.

FIG. 8 shows maps for modifying based on the air-fuel ratio when the amount by which the actual fuel pressure exceeds the target fuel pressure is larger than a first limit difference value. Map (a) of FIG. 8 is a plot of the air-fuel ratio modification amount versus the difference between the actual fuel pressure and the target fuel pressure. As indicated, the larger the difference between the actual fuel pressure and the target fuel pressure is, the more the air-fuel ratio needs to be enriched. Maps (b) and (c) of FIG. 8 plot the modification amounts of the fuel injection timing and the ignition timing versus the air-fuel ratio modification amount. The richer the air-fuel ratio modification amount is, the more the fuel injection timing and the ignition timing need to be retarded. Air-fuel-ratio-based modification maps like these are stored in the ROM or other memory of the engine control unit 100 and used to modify the air-fuel ratio, fuel injection timing, and ignition timing when the amount by which the actual fuel pressure exceeds the target fuel pressure is larger than a first limit difference value (where the first limit difference value=a first limit value minus target fuel pressure).

Combustion Control Flowchart

Figure 9:
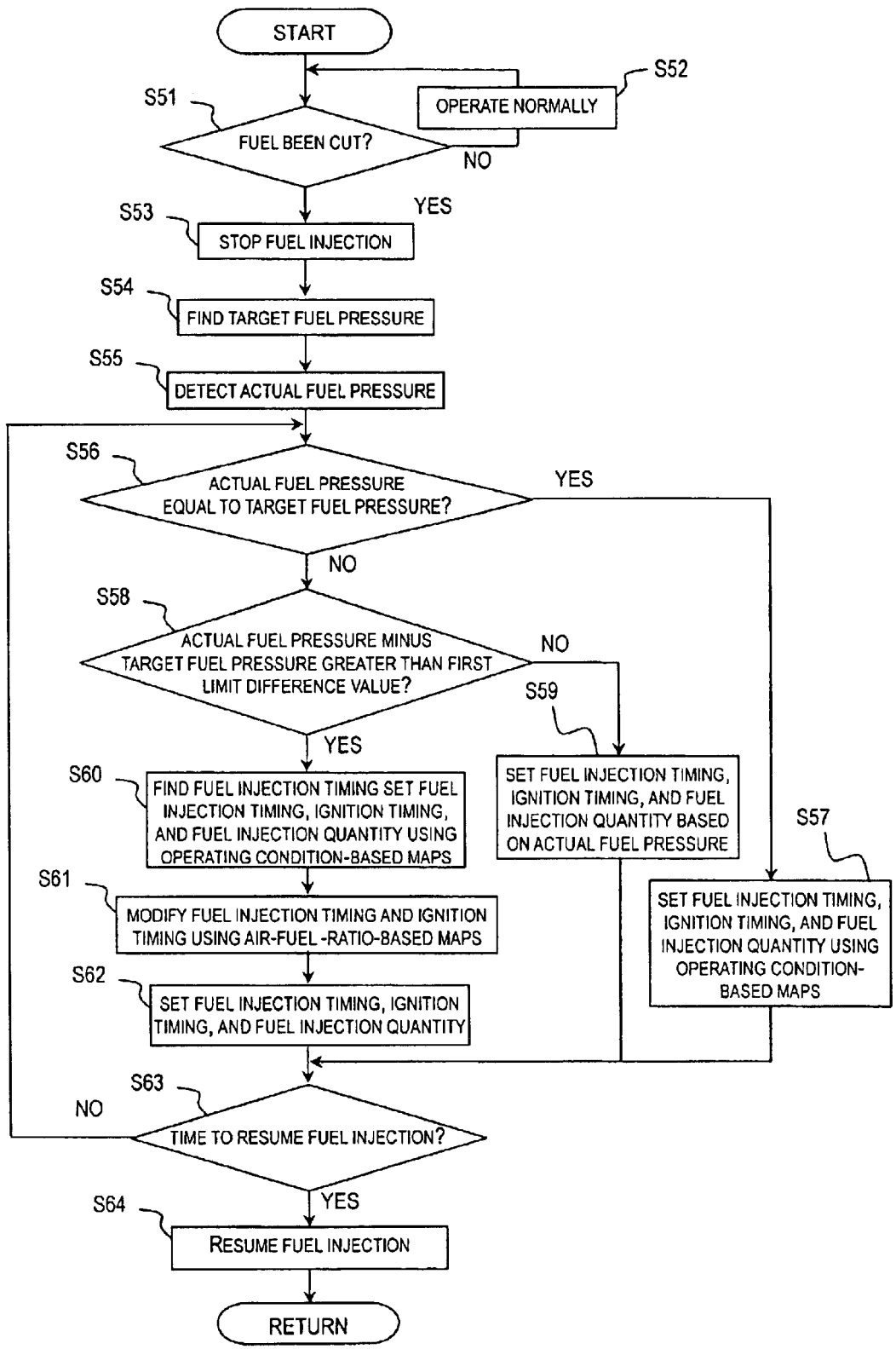
FIG. 9 is a flowchart for combustion control in accordance with the third embodiment.

FIG. 9 is a flowchart for combustion control in accordance with the third embodiment. Steps S51 to S56 are the same as steps S11 to S16 and thus their explanation is omitted.

In step S57, since the actual fuel pressure matches the target fuel pressure, the fuel injection timing and ignition timing are found and set by referring to the operating condition-based maps (b) and (c) of FIG. 2. The air-fuel ratio is also found by referring to the operating condition-based map (d) of FIG. 2, and the fuel injection quantity is calculated and set based on this air-fuel ratio and the intake air quantity.

In step S58, it is determined if the amount by which the actual fuel pressure exceeds the target fuel pressure is larger than the first limit difference value. If not, control proceeds to step S59. If so, control proceeds to step S60.

Step 59 is the same as steps S18 to S20 of the first embodiment or steps S38 to S39 of the second embodiment; the fuel injection timing, the ignition timing, and the fuel injection quantity are set according to the actual fuel pressure.

In step S60, the fuel injection timing and ignition timing are found by referring to the operating condition-based maps (b) and (c) of FIG. 2 and the air-fuel ratio is found by referring to the operating condition-based map (d) of FIG. 2.

In step S61, the air-fuel ratio is modified to a richer ratio using an air-fuel ratio modification amount found by referring to the air-fuel-ratio-based modification map (a) of FIG. 8. The fuel injection quantity is then calculated based on the modified air-fuel ratio and the intake air quantity. Also, the fuel injection timing and ignition timing are retarded using modification amounts found by referring the air-fuel-ratio-based modification map (d) of FIG. 8.

In step S62, the fuel injection timing and ignition timing that were determined in step S61 are set. The fuel injection quantity that was determined in step S61 is also set.

In step S63, it is determined if it is time to resume fuel injection. If not, control returns to step S56. If so, control proceeds to step S64.

In step S64, fuel injection is resumed using the fuel injection timing, ignition timing, and fuel injection quantity set in step S57, S59 or S62 and stratified combustion is conducted.

In a combustion control system in accordance with this embodiment, when the amount by which the actual fuel pressure exceeds the target fuel pressure is larger than a first limit difference value, appropriate combustion control can be accomplished by modifying the air-fuel ratio to a richer value based on the difference between the actual fuel pressure and the target fuel pressure and retarding the fuel injection timing and ignition timing based on the air-fuel ratio modification amount.

Fourth Embodiment

In the third embodiment, when the amount by which the actual fuel pressure exceeds the target fuel pressure is larger than a first limit difference value, the fuel injection timing, ignition timing, and air-fuel ratio are found using operating condition-based maps (b), (c), and (d) of FIG. 2 and modified using modification amounts found using air-fuel-ratio-based modification maps (a) to (c) of FIG. 8. Meanwhile, as is done in this embodiment, it is also acceptable to create in advance a map that stores air-fuel ratios corresponding to actual fuel pressure values and fuel injection timings and ignition timings corresponding to the air-fuel ratios In this embodiment, a map of the air-fuel ratio, fuel injection timing, and ignition timing for cases in which the amount by which the actual fuel pressure exceeds the target fuel pressure is larger than a first limit difference value is created in advance. This air-fuel-ratio-based map is created by finding ignition timings, fuel injection timings, and air-fuel ratios using the operating condition-based maps (b), (c), and (d) of FIG. 2 and then enriching the air-fuel ratios and retarding the fuel injection timings and ignition timings using the air-fuel-ratio-based modification maps (a) to (c) of FIG. 8.

Combustion Control Flowchart

Figure 10:
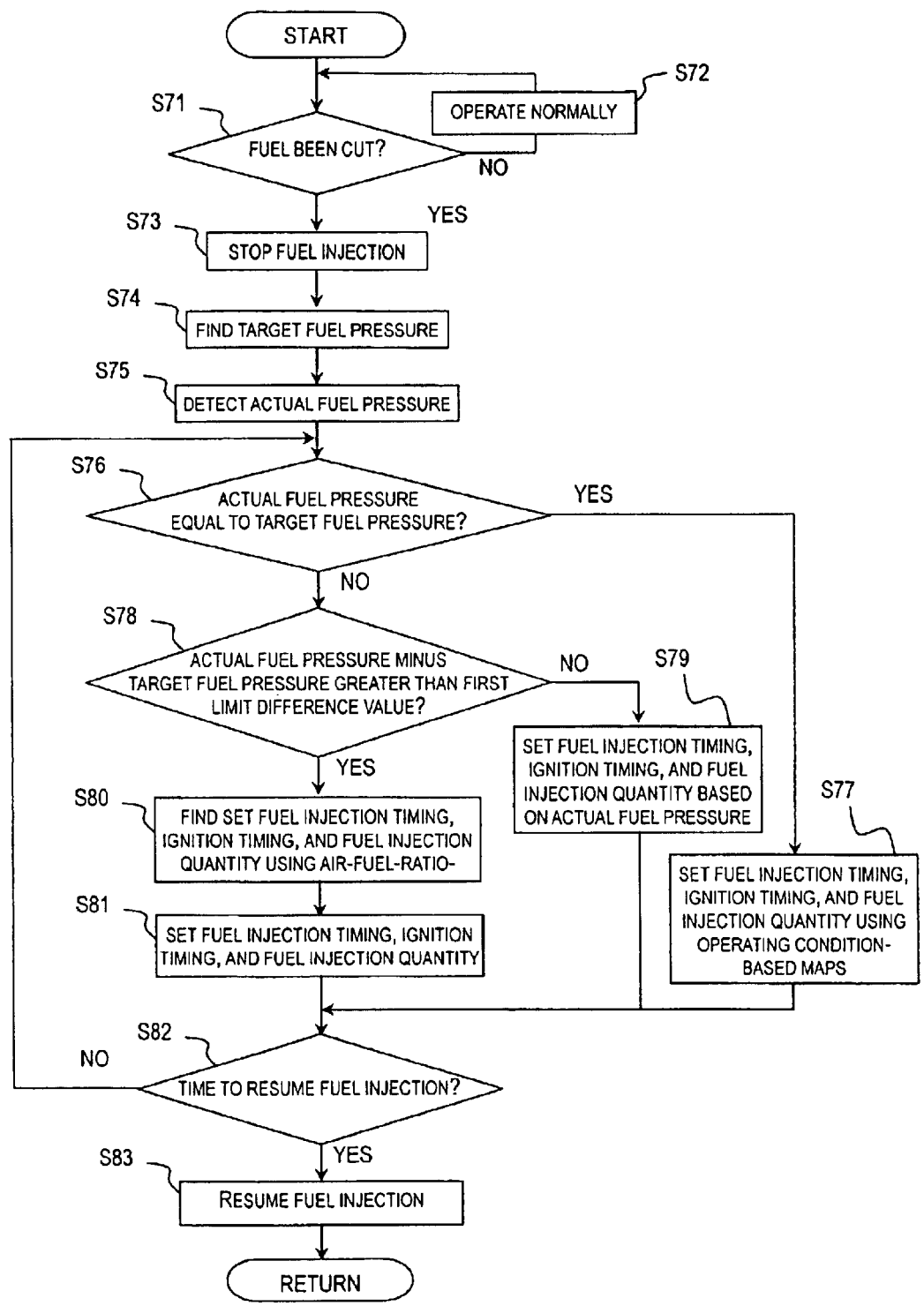
FIG. 10 is a flowchart for combustion control in accordance with the fourth embodiment.

FIG. 10 is a flowchart for combustion control in accordance with the fourth embodiment. Steps S71 to S76 are the same as steps S11 to S16 and thus their explanation is omitted.

In step S77, since the actual fuel pressure matches the target fuel pressure, the fuel injection timing and ignition timing are found and set by referring to the operating condition-based (a) to (c) of FIG. 8. The air-fuel ratio is also found by referring to the operating condition-based map (d) of FIG. 2, and the fuel injection quantity is calculated and set based on this air-fuel ratio and the intake air quantity.

In step S78, it is determined if the amount by which the actual fuel pressure exceeds the target fuel pressure is larger than the first limit difference value. If not, control proceeds to step S79. If so, control proceeds to step S80.

Step 79 is the same as steps S18 to S20 of the first embodiment or steps S38 to S39 of the second embodiment; the fuel injection timing, the ignition timing, and the fuel injection quantity arc set according to the actual fuel pressure.

In step S80, the air-fuel ratio, fuel injection timing, and ignition timing are found by referring to the maps stored in the ROM or other memory of the engine control unit 100. The fuel injection quantity is also calculated based on the air-fuel ratio and intake air quantity.

In step S81, the fuel injection timing and ignition timing that were determined in step S80 are set. The fuel injection quantity that was determined in stepS80 is also set.

In step S82, it is determined if it is time to resume fuel injection. If not, control returns to step S76. If so, control proceeds to step S83.

In step S83, fuel injection is resumed using the fuel injection timing, ignition timing, and fuel injection quantity set in step S77, S79 or S81 and stratified combustion is conducted.

In a combustion control system in accordance with this embodiment, when the amount by which the actual fuel pressure exceeds the target fuel pressure is larger than a first limit difference value, appropriate combustion control can be accomplished by modifying the air-fuel ratio to a richer value based on the actual fuel pressure and retarding the fuel injection timing and ignition timing based on the modified air-fuel ratio.

In this embodiment, an air-fuel ratio map is created in advance which stores air-fuel ratios corresponding to actual fuel pressures and fuel injection timings and ignition timings corresponding to the air-fuel ratios. As a result, the combustion control processing executed when the amount by which the actual fuel pressure exceeds the target fuel pressure is larger than a first limit difference value is simplified in comparison with a case in which the air-fuel ratio, fuel injection timing, and ignition timing are first found based on operating condition-based maps (a), (b), and (d) of FIG. 2 and then modified using air-fuel-ratio-based modification maps (a) to (c) of FIG. 8.

Fifth Embodiment

In cases where the amount by which the actual fuel pressure exceeds the target fuel pressure is larger than a first limit difference value, the third and fourth embodiments make it possible to conduct stratified combustion by enriching the air-fuel ratio. However, it is also acceptable to change the combustion mode from stratified combustion to homogeneous combustion. In homogeneous combustion, the fuel is injected during the intake stroke. Consequently, it is not necessary to control the position of the air-fuel mixture having the optimum air-fuel ratio at the time of spark ignition and the combustion can be controlled appropriately even when the amount by which the actual fuel pressure exceeds the target fuel pressure is larger than a first limit difference value.

Combustion Control Flowchart

Figure 11:
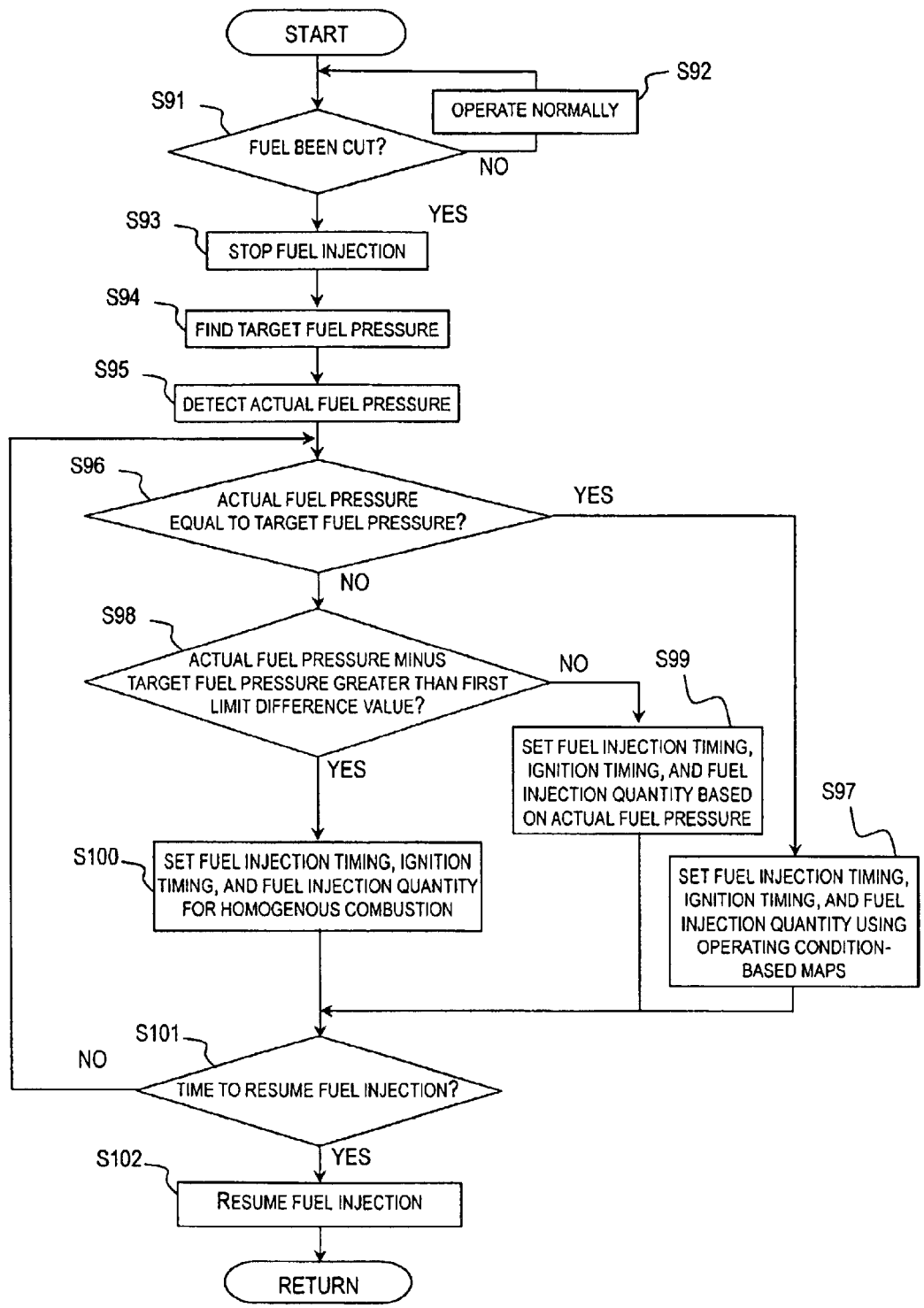
FIG. 11 is a flowchart for combustion control in accordance with the fifth embodiment.

FIG. 11 is a flowchart for combustion control in accordance with the fifth embodiment. Steps S91 to S96 are the same as steps S11 to S16 and thus their explanation is omitted.

In step S97, since the actual fuel pressure matches the target fuel pressure, the fuel injection timing and ignition timing are found and set by referring to the operating condition-based maps (b) and (c) of FIG. 2. The air-fuel ratio is also found by referring to the operating condition-based map (d) of FIG. 2, and the fuel injection quantity is calculated and set based on this air-fuel ratio and the intake air quantity.

In step S98, it is determined if the amount by which the actual fuel pressure exceeds the target fuel pressure is larger than the first limit difference value. If not, control proceeds to step S99. If so, control proceeds to step S100.

Step 99 is the same as steps S18 to S20 of the first embodiment or steps S38 to S39 of the second embodiment; the fuel injection timing, the ignition timing, and the fuel injection quantity are set according to the actual fuel pressure.

In step S100, the fuel injection timing, ignition timing, and fuel injection quantity for intake stroke injection are set for homogeneous combustion.

In step S101, it is determined if it is time to resume fuel injection. If not, control returns to step S96. If so, control proceeds to step S102.

In step S102, fuel injection is resumed using the fuel injection timing, ignition timing, and fuel injection quantity set in step S97, S99 or S100 and homogeneous combustion is conducted.

In this embodiment, when the amount by which the actual fuel pressure exceeds the target fuel pressure is equal to or less than a first limit difference value, stratified combustion is conducted by controlling the fuel injection timing and ignition timing based on the actual fuel pressure. Meanwhile, when the amount by which the actual fuel pressure exceeds the target fuel pressure is larger than a first limit difference value, the fuel is injected during the intake stroke and homogeneous combustion is conducted, thus enabling the degradation of combustion conditions that can occur during stratified combustion to be prevented.

Sixth Embodiment

In cases where the amount by which the actual fuel pressure exceeds the target fuel pressure is larger than a first limit difference value, the fifth embodiment controls the combustion by switching to homogeneous combustion. However, it is also acceptable to configure the system such that, like the third and fourth embodiments, stratified combustion is conducted by enriching the air-fuel ratio when the amount by which the actual fuel pressure exceeds the target fuel pressure is larger than a first limit difference value and homogeneous combustion is conducted when the amount by which the actual fuel pressure exceeds the target fuel pressure is larger than a second limit difference value that is larger than the first limit difference value.

Combustion Control Flowchart

Figure 12:
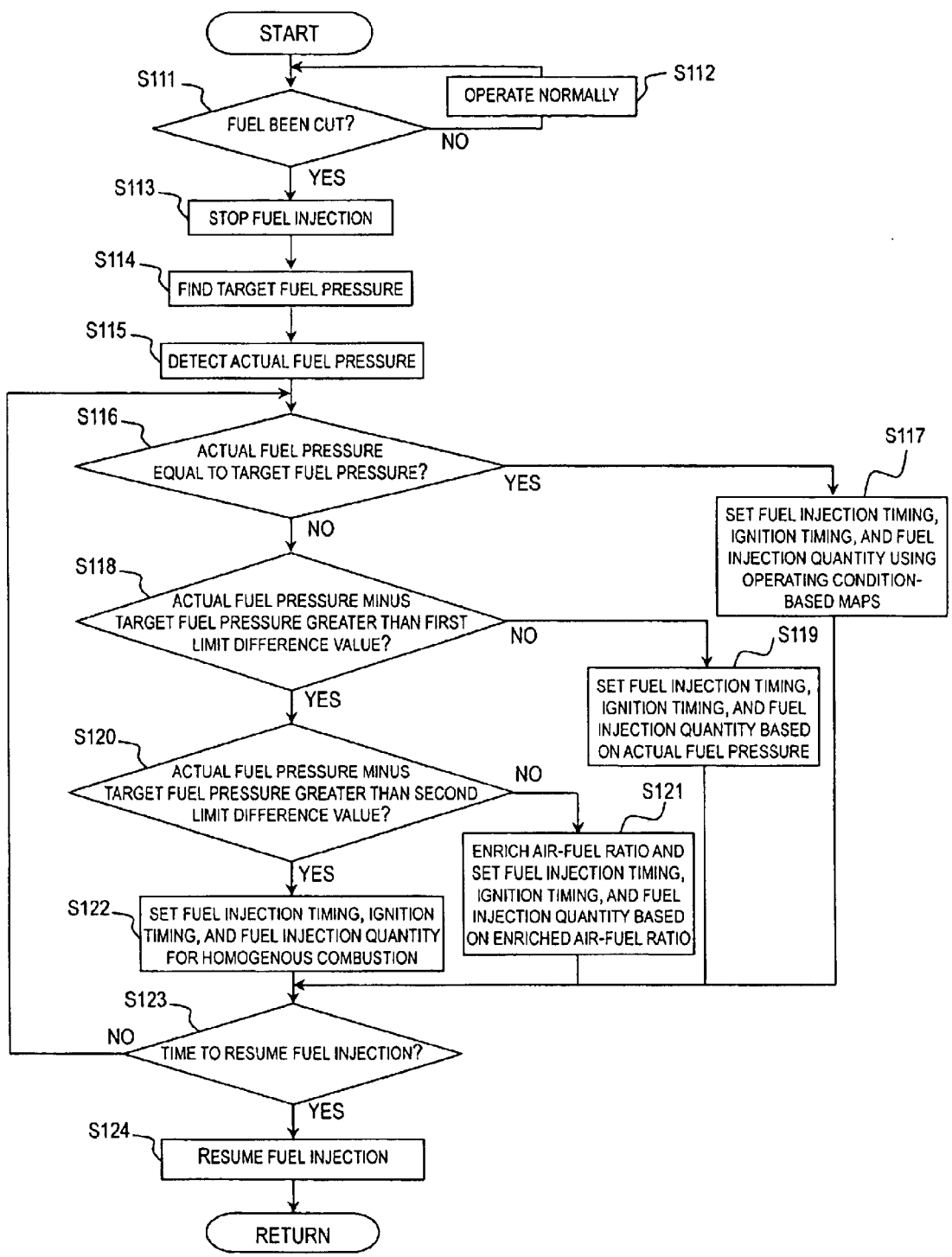
FIG. 12 is a flowchart for combustion control in accordance with the sixth embodiment.

FIG. 12 is a flowchart for combustion control in accordance with the sixth embodiment. Steps S111 to S116 are the same as steps S11 to S16 and thus their explanation is omitted.

In step S117, since the actual fuel pressure matches the target fuel pressure, the fuel injection timing and ignition timing are found and set by referring to the operating condition-based maps (b) and (c) of FIG. 2. The air-fuel ratio is also found by referring to the operating condition-based map (d) of FIG. 2, and the fuel injection quantity is calculated and set based on this air-fuel ratio and the intake air quantity.

In step S118, it is determined if the amount by which the actual fuel pressure exceeds the target fuel pressure is larger than the first limit difference value. If not, control proceeds to step S119. If so, control proceeds to step S120.

Step 119 is the same as steps S18 to S20 of the first embodiment or steps S38 to S39 of the second embodiment, i.e., the fuel injection timing, the ignition timing, and the fuel injection quantity are set according to the actual fuel pressure.

In step S120, it is determined if the amount by which the actual fuel pressure exceeds the target fuel pressure is larger than the second limit difference value. If not, control proceeds to step S121. If so, control proceeds to step S122.

Steps 121 is the same as steps S60 to S62 of the third embodiment or steps S80 and S81 of the fourth embodiment, i.e., the air-fuel ratio is enriched and the fuel injection timing and the ignition timing are set according to the enriched air-fuel ratio.

In step S122, the fuel injection timing, ignition timing, and fuel injection quantity for intake stroke injection are set.

In step S123, it is determined if it is time to resume fuel injection. If not, control returns to step S116. If so, control proceeds to step S124.

In step S124, fuel injection is resumed using the fuel injection timing, ignition timing, and fuel injection quantity set in step S117, S119 or S121 and stratified combustion is conducted, or fuel injection is resumed using the fuel injection timing, ignition timing, and fuel injection quantity set in step S122 and homogeneous combustion is conducted.

In this embodiment, combustion is controlled as follows. When the amount by which the actual fuel pressure exceeds the target fuel pressure is equal to or less than a first limit difference value, stratified combustion is conducted by controlling the fuel injection timing and ignition timing based on the actual fuel pressure. When the amount by which the actual fuel pressure exceeds the target fuel pressure is larger than the first limit difference value but equal to or less than a second limit difference value, stratified combustion is conducted by enriching the air-fuel ratio and retarding the fuel injection timing and ignition timing in accordance with the enriched air-fuel ratio. When the amount by which the actual fuel pressure exceeds the target fuel pressure is larger than the second limit difference value, homogeneous combustion is conducted. As a result, stratified combustion is conducted as much as possible and fuel efficiency is improved. Also, by conducting homogeneous combustion when the amount by which the actual fuel pressure exceeds the target fuel pressure is larger than the second limit difference value and stratified combustion cannot be conducted properly, degradation of the combustion control is prevented.

Other Embodiments

In the previously described embodiments, when the fuel injection is resumed and stratified combustion is conducted after having stopped the fuel injection, the fuel injection timing and ignition timing are both controlled based on the actual fuel pressure or the air-fuel ratio. However, it is also acceptable to control one, i.e., either the fuel injection timing or the ignition timing, using the operating condition-based maps (b) and (c) of FIG. 2 and control the other based on the actual fuel pressure or the air-fuel ratio.

Here, too, the combustion state can be improved to some degree by determining only one or the other of the fuel injection timing and the ignition timing based on the actual fuel pressure or the air-fuel ratio.

Although the previously described embodiments provide a pre-fuel cut delay time, which is a period during which fuel injection is continued after the throttle valve 16 is closed until fuel injection is stopped, it is also acceptable not to provide a pre-fuel cut delay time if the shock of resuming fuel injection is alleviated by some other method. In such a case, the fuel efficiency is improved even further because the fuel injection can be stopped immediately after closing the throttle valve 16.

The previously described embodiments present cases in which deceleration is commenced by closing the throttle valve 16 during steady-state travel and fuel injection is resumed when the engine rotational speed reaches a prescribed rotational speed. The invention can also be used to improve the combustion control executed at the time of fuel injection resumption in a case where the throttle valve 16 is closed at 2000 rpm after warm-up mode is completed and fuel injection is resumed when the engine rotational speed reaches a prescribed rotational speed.

Also, although the previously described embodiments improve the control of stratified combustion by enriching the air-fuel ratio when the amount by which the actual fuel pressure exceeds the target fuel pressure is larger than a first limit difference value, it is also acceptable to improve the stratified combustion control by performing two fuel injections during the compression stroke instead of enriching the air-fuel ratio.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-023317. The entire disclosure of Japanese Patent Application No. 2003-023317 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A combustion control system for a direct fuel injection spark ignition engine comprising:
    a target fuel pressure acquiring section configured to acquire a target fuel pressure required to resume fuel injection based on operating conditions existing when fuel injection is determined to be resumed after a prescribed amount of time has elapsed since fuel injection was temporarily stopped due to occurrence of prescribed operating conditions;
    an actual fuel pressure detecting section configured to detect an actual fuel pressure inside an accumulator of a high-pressure fuel delivery system when fuel injection is determined to be resumed;
    a timing acquiring section configured to acquire a fuel injection timing and an ignition timing required to resume fuel injection based on the operating conditions existing when fuel injection is determined to be resumed; and
    a first timing control section configured to compare the target fuel pressure and the actual fuel pressure and modify at least one of the fuel injection timing and the ignition timing based on a result of the comparison when fuel injection is to be resumed.

2. The direct fuel injection combustion control system recited in claim 1, wherein
    the first timing control section is further configured to modify at least one of the fuel injection timing and the ignition timing determined by the timing acquiring section based on a difference between the actual fuel pressure and the target fuel pressure.

3. The direct fuel injection combustion control system recited in claim 2, wherein
    the first timing control section is further configured to modify both the fuel injection timing and the ignition timing.

4. The direct fuel injection combustion control system recited in claim 1, wherein
    the first timing control section includes a first timing memory section configured to store at least one of the fuel injection timing and the ignition timing corresponding to the actual fuel pressure, and a first timing reading section configured to read at least one of a stored fuel injection timing and a stored ignition timing stored in the first timing memory section based on the actual fuel pressure detected by the actual fuel pressure detecting section.

5. The direct fuel injection combustion control system recited in claim 4, wherein
    the first timing control section is further configured to modify both the fuel injection timing and the ignition timing.

6. The direct fuel injection combustion control system recited in claim 1, wherein
    the first timing control section is further configured to modify both the fuel injection timing and the ignition timing.

7. The direct fuel injection combustion control system recited in claim 1, further comprising
    an air-fuel ratio acquiring section configured to acquire an air-fuel ratio required for resuming fuel injection based on the operating conditions existing when fuel injection is determined to be resumed;
    an air-fuel ratio control section configured to control the air-fuel ratio based on the actual fuel pressure;
    a second timing control section configured to control at least one of the fuel injection timing and the ignition timing based on the air-fuel ratio controlled by the air-fuel ratio control section; and
    a first timing control selecting section configured to select a first control executed by the first timing control section when a difference between the actual fuel pressure and the target fuel pressure is less than or equal to a preset first limit difference value, and a second control executed by the second timing control section when an amount by which the actual fuel pressure exceeds the target fuel pressure is greater than the first limit difference value.

8. The direct fuel injection combustion control system recited in claim 7, wherein
    the second timing control section is further configured to control both the fuel injection timing and the ignition timing.

9. The direct fuel injection combustion control system recited in claim 7, wherein
    the air-fuel ratio control section is further configured to modify the air-fuel ratio acquired by the air-fuel ratio acquiring section based on the difference between the actual fuel pressure and the target fuel pressure; and
    the second timing control section is further configured to modify at least one of the fuel injection timing and the ignition timing based on the amount by which the air-fuel ratio is modified.

10. The direct fuel injection combustion control system recited in claim 9, wherein
    the second timing control section is further configured to control both the fuel injection timing and the ignition timing.

11. The direct fuel injection combustion control system recited in claim 7, wherein the air-fuel ratio control section includes an air-fuel ratio memory section configured to store air-fuel ratios corresponding to actual fuel pressures for cases in which the difference between the actual fuel pressure and the target fuel pressure is greater than the first limit difference value, and an air-fuel ratio reading section configured to read one of the air-fuel ratios stored in the air-fuel ratio memory section based on the actual fuel pressure detected by the actual fuel pressure detecting section; and the second timing control section includes a second timing memory section configured to store at least one of the fuel injection timings and the ignition timings corresponding to the air-fuel ratios for cases in which the difference is greater than the first limit difference value, and a second timing reading section configured to read at least one of the fuel injection timings and an ignition timings stored in the second timing memory section based on the air-fuel ratio read with the air-fuel ratio reading section.

12. The direct fuel injection combustion control system recited in claim 11, wherein the second timing control section is further configured to control both the fuel injection timing and the ignition timing.

13. The direct fuel injection combustion control system recited in claim 7, wherein the first timing control selecting section is further configured to selectively perform one of:
stratified combustion using the first control executed by the first timing control section when the difference between the actual fuel pressure and the target fuel pressure is less than or equal to a preset first limit difference value;
stratified combustion using the second control executed by the second timing control section and the air-fuel ratio control section when the difference is greater than the first limit difference value and less than or equal to a preset second limit difference value that is greater than the first limit difference value; and
homogeneous combustion using an intake stroke fuel injection timing and an intake stroke ignition timing for intake stroke injection when the difference is greater than the second limit difference value.

14. The direct fuel injection combustion control system recited in claim 1, further comprising a second timing control selecting section configured to selectively perform one of:
stratified combustion using the first control executed by the first timing control section when the difference between the actual fuel pressure and the target fuel pressure is less than or equal to a preset first limit difference value; and
homogeneous combustion using an intake stroke fuel injection timing and an intake stroke ignition timing for intake stroke injection when the aforementioned difference is greater than the first limit difference value.

15. A direct fuel injection combustion control method for a direct fuel injection spark ignition engine comprising:

target fuel pressure acquiring means for acquiring a target fuel pressure in which a target fuel pressure required for resuming fuel injection based on operating conditions existing when fuel injection is determined to be resumed after a prescribed amount of time has elapsed since fuel injection was temporarily stopped due to occurrence of prescribed operating conditions;

actual fuel pressure means for detecting an actual fuel pressure in which the actual fuel pressure inside an accumulator of a high-pressure fuel delivery system when fuel injection is determined to be resumed;

timing acquiring means for acquiring a fuel injection timing and an ignition timing required for resuming fuel injection based on the operating conditions existing when fuel injection is determined to be resumed; and timing control means for controlling the fuel injection timing and the ignition timing, when fuel injection is to be resumed, by comparing the target fuel pressure with the actual fuel pressure are compared and modifying at least one of the fuel injection timing and the ignition timing based on a result of the comparison when fuel injection is to be resumed.

16. A direct fuel injection combustion control method for a direct fuel injection spark ignition engine comprising:

acquiring a target fuel pressure in which a target fuel pressure required for resuming fuel injection based on operating conditions existing when fuel injection is determined to be resumed after a prescribed amount of time has elapsed since fuel injection was temporarily stopped due to occurrence of prescribed operating conditions;

detecting an actual fuel pressure in which the actual fuel pressure inside an accumulator of a high-pressure fuel delivery system when fuel injection is determined to be resumed;

acquiring a fuel injection timing and an ignition timing required for resuming fuel injection based on the operating conditions existing when fuel injection is determined to be resumed; and controlling the fuel injection timing and the ignition timing, when fuel injection is to be resumed, by comparing the target fuel pressure with the actual fuel pressure are compared and modifying at least one of the fuel injection timing and the ignition timing based on a result of the comparison when fuel injection is to be resumed.

* * * * *